US009763176B2

(12) United States Patent
Lair et al.

(10) Patent No.: US 9,763,176 B2
(45) Date of Patent: Sep. 12, 2017

(54) COMMUNICATIONS SYSTEM

(71) Applicant: NEC Corporation, Tokyo (JP)

(72) Inventors: Yannick Lair, Berkshire (GB); Iskren Ianev, Berkshire (GB); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/761,982

(22) PCT Filed: Jan. 10, 2014

(86) PCT No.: PCT/JP2014/050867
§ 371 (c)(1),
(2) Date: Jul. 20, 2015

(87) PCT Pub. No.: WO2014/112609
PCT Pub. Date: Jul. 24, 2014

(65) Prior Publication Data
US 2015/0358898 A1    Dec. 10, 2015

(30) Foreign Application Priority Data

Jan. 21, 2013 (GB) .................................. 1301042.6

(51) Int. Cl.
H04W 4/00        (2009.01)
H04W 48/16       (2009.01)
(Continued)

(52) U.S. Cl.
CPC ........... H04W 48/16 (2013.01); H04W 48/12 (2013.01); H04W 76/027 (2013.01);
(Continued)

(58) Field of Classification Search
CPC ... H04W 48/16; H04W 88/16; H04W 76/027; H04W 48/12; H04W 80/04; H04W 48/17
(Continued)

(56) References Cited

U.S. PATENT DOCUMENTS 5,852,630 A * 12/1998 Langberg ............ H04L 27/2647
                                                            375/219
7,062,270 B1    6/2006 Dalvie et al.
(Continued)

FOREIGN PATENT DOCUMENTS

WO    WO 2004/012433 A1    2/2004

OTHER PUBLICATIONS

Nokia Siemens Networks, "Cause value 'Multiple PDN connections for a given APN not allowed'", 3GPP TSG CT WG4 Meeting #58bis, C4-121972, Oct. 2012.
(Continued)

Primary Examiner — Dhaval Patel
(74) Attorney, Agent, or Firm — Finnegan, Henderson, Farabow, Garrett & Dunner, L.L.P.

(57) ABSTRACT

A communications system is described in which a core network apparatus provides a configuration for accessing a packet data network by a mobile communications device when operator determined barring is in place. Also disclosed are signalling messages used to control the setting up of the packet data connection, which messages are sent between a device in the core network and the mobile communications device.

7 Claims, 10 Drawing Sheets

(51) Int. Cl.
*H04W 88/16* (2009.01)
*H04W 48/12* (2009.01)
*H04W 76/02* (2009.01)
*H04W 80/04* (2009.01)
*H04W 48/00* (2009.01)

(52) U.S. Cl.
CPC ............ *H04W 88/16* (2013.01); *H04W 48/17* (2013.01); *H04W 80/04* (2013.01)

(58) Field of Classification Search
USPC ......... 455/434, 432.1, 432.2, 433, 429, 450; 370/230, 311, 329, 338
See application file for complete search history.

(56) References Cited

U.S. PATENT DOCUMENTS

| | | | | |
|---|---|---|---|---|
| 7,773,973 | B2* | 8/2010 | Wang | H04L 63/0869 455/411 |
| 2003/0009271 | A1 | 1/2003 | Akiyama | |
| 2004/0018836 | A1 | 1/2004 | Jang | |
| 2005/0176438 | A1* | 8/2005 | Li | H04W 12/08 455/450 |
| 2013/0083726 | A1* | 4/2013 | Jain | H04W 4/005 370/328 |
| 2014/0254363 | A1* | 9/2014 | Tanaka | H04W 28/0226 370/230 |

OTHER PUBLICATIONS

ZTE, "PDN Connection for emergency service", 3GPP TSG CT WG1 Meeting #60, C1-093423-v3, Aug. 2009.

3GPP TS 23.402 V11.5.0, "Architecture enhancements for non-3GPP accesses", $3^{rd}$ Generation Partnership Project, Technical Specification Group Services and System Aspects, Release 11, pp. 1-252, Dec. 2012.

3GPP TS 23.401 V8.0.0, "General Packet Radio Service (GPRS) enhancements for Evolved Universal Terrestrial Radio Access Network (E-UTRAN) access", $3^{rd}$ Generation Partnership Project, Technical Specification Group Services and System Aspects, Release 8, pp. 1-167, Dec. 2007.

3GPP TS 23.015 V11.1.0, "Technical realization of Operator Determined Barring (ODB)", $3^{rd}$ Generation Partnership Project, Technical Specification Group Core Network and Terminals, Release 11, pp. 1-30, Dec. 2012.

International Search Report mailed Feb. 10, 2014 in corresponding PCT International Application.

Extended European Search Report issued by the European Patent Office on Jul. 29, 2016, in counterpart European Patent Application No. 14740941.1.

\* cited by examiner

COMMUNICATIONS SYSTEM

CROSS-REFERENCE TO RELATED PATENT APPLICATIONS

This application is a National Stage Entry of International Application No. PCT/JP2014/050867, filed Jan. 10, 2014, which claims priority from British Patent Application No. 1301042.6, filed Jan. 21, 2013. The entire contents of the above-referenced applications are expressly incorporated herein by reference.

TECHNICAL FIELD

The present invention relates to a communications system and to parts thereof. The invention has particular but not exclusive relevance to wireless communications systems and devices thereof operating according to the 3rd Generation Partnership Project (3GPP) standards or equivalents or derivatives thereof. The invention has particular although not exclusive relevance to the management of direct communication from one communications device to another.

BACKGROUND ART

The latest developments of the 3GPP standards are referred to as the Long Term Evolution (LTE) of EPC (Evolved Packet Core) network and E-UTRAN (Evolved UMTS Terrestrial Radio Access Network). Under the 3GPP standards, a NodeB (or an eNB in LTE) is the base station via which mobile communications devices connect to a core network and communicate with other communications devices or remote servers. For simplicity, the present application will use the term base station to refer to any such base stations. Communications devices might be, for example, mobile communications devices such as mobile telephones, smartphones, user equipment (UE), personal digital assistants (PDAs), laptop computers, web browsers, and the like. 3GPP standards also make it possible to connect non-mobile user equipment to the network, such as Wi-Fi routers, modems, which can be implemented as a part of a (generally) stationary apparatus. For simplicity, the present application refers to mobile telephones in the description, but it will be appreciated that the technology described can be implemented on any mobile and "non-mobile" equipment that can connect to such a core network.

LTE also allows mobile telephones to connect to the core network using 'non-3GPP' access technologies as well, such as Wi-Fi (based on the Institute of Electrical and Electronics Engineers' (IEEE) 802.11 family of standards), WiMAX (based on the IEEE 802.16 family of standards), and the like. A list of supported access technologies is published in the 3GPP TS 23.402 standards document.

A Mobility Management Entity (MME) in the core network manages the connections of the mobile telephones with the core network. When a mobile telephone attaches to the LTE network via a base station, the MME sets up a default Evolved Packet System (EPS) Bearer between the mobile telephone and a gateway in the core network. An EPS Bearer defines a transmission path through the network and assigns an IP address to the mobile telephone to be used by the mobile telephone to communicate with remote servers or other communication devices. An EPS Bearer also has a set of data transmission characteristics, such as quality of service, data rate and flow control parameters, which are defined by the subscription associated with the mobile telephone and are established by the MME upon registration of the mobile telephone with the network.

The EPS Bearer is thus managed by the MME, which signals to the mobile telephone when it needs to activate, modify, or deactivate a particular EPS Bearer. Thus there are two connections between the mobile telephone and the communication network: one for the user data transmitted using the established EPS bearer (also known as the user plane) and another one for managing the EPS Bearer itself (also known as the control plane).

The so-called Non-Access Stratum (NAS) protocols form the highest stratum of the control plane between the mobile telephone and the MME. NAS protocols support a mobility of the mobile telephone and session management procedures to establish and maintain IP connectivity between the mobile telephone and a PDN GW (Packet Data Network Gateway). The Evolved Packet System (EPS) offers "ready-to-use" IP connectivity and "always-on" features to compatible mobile telephones. The NAS protocols include e.g. the EPS Mobility Management (EMM) and EPS Session Management (ESM) protocols. The EMM protocol provides NAS security and mobility control for the mobile telephones in the E-UTRAN, whilst the ESM protocol provides procedures for the handling of EPS bearer contexts.

The mobile telephone needs to register with the communications network (or communications system) in order to receive packet data services and/or other services requiring registration. This registration is also known as 'network attachment' and is described in more detail in section 5.3.2 of the 3GPP TS 23.401 standard, the contents of which are incorporated herein by reference. The mobile telephone can benefit from always-on IP connectivity by establishing a default EPS bearer during network attachment. The attach procedure may also trigger establishment of one or more dedicated EPS bearer(s). During the attach procedure, the mobile telephone also receives an IP address from the network.

During the attach procedure, the mobile telephone provides its unique identifier, e.g. a 'Mobile Equipment Identity' (IMEI) to the MME. The MME passes the obtained identifier to the home subscriber server (HSS) and to the packet data network gateway (PDN GW or P-GW) serving this mobile telephone.

Typically, a number of gateways are provided between the communications network and the external computer network(s), such as the public Internet, that the mobile telephone is allowed to access. Different gateways may be employed, for example, to provide access to different networks and/or to different services and/or for load balancing purposes. Different gateways are also provided in different operator networks (PLMNs). Each gateway may be identified by its name, which is often referred to as the Access Point Name (APN). The APN is used in other 3GPP data access networks, e.g. general packet radio service (GPRS) networks (2g) or Wideband Code Division Multiple Access (W-CDMA) networks (3g).

In order to establish a packet data connection with an external network, a mobile telephone must be configured with an APN to use when requesting a connection. The communication network will then examine this identifier to determine the type of data connection to be created. Using this identifier, the communications network may also determine, for example, an IP address to be assigned to the mobile telephone, a security method to be used, whether or not a connection to a private network is to be created, and so on.

More specifically, based on the APN the communications network identifies the packet data network that the mobile telephone attempts to communicate with. In addition to identifying the PDN itself, an APN may also be used to define the type of service provided by the PDN, e.g. a multimedia messaging service (MMS), a file sharing service, a social networking service, a video streaming service, and the like.

However, the network operator may enforce barring of packet data services for its subscribers. Such barring is referred to as 'operator determined barring' (ODB) and may be applicable to either all or a sub-set of all APNs. The network operator may at any time activate/deactivate this feature by appropriately configuring the HSS data for the particular subscriber. Activation of ODB results in termination of any relevant services in progress, and barring of future requests for service covered by the barring category.

For example, certain subscribers (i.e. their mobile telephones) may be barred from using any packet data services at all, e.g. as specified by their subscription with the network operator. Alternatively, a mobile telephone may be allowed access to some specific APNs only (e.g. APNs providing a specific type of packet data service and/or operated by a specific service provider) while being barred from accessing all other APNs. For example, a mobile telephone may be barred from requesting packet data services from access points that are located within a visited network (VPLMN) whilst the mobile telephone is roaming away from their home network (HPLMN) (whilst use of APNs in the HPLMN may be still allowed).

When barring of access to all except some specific APNs is invoked in the HSS, the HSS updates the subscription profile of that user to contain only the specific non-barred APNs as 'subscribed APNs' and indicates the updated subscription information to the MME. This will allow the MME to enforce barring of packet data connections for each mobile telephone appropriately.

In particular, when the MME receives a request for PDN connectivity (e.g. a 'PDN Connectivity Request') from a mobile telephone, it checks whether or not the requested APN is included in the list of subscribed APNs for that subscriber. If the requested APN is included, then the MME continues with the PDN connectivity procedures and configures the requested packet data service for the mobile telephone. However, if the APN is not included in the list provided by the HSS, then the MME rejects the PDN connectivity request (e.g. by sending a 'PDN Connectivity Reject' response) and provides an appropriate rejection cause to the mobile telephone. Furthermore, when the MME receives the list of subscribed APNs for a subscriber, it checks whether the subscriber's mobile telephone has any existing PDN connection via APNs that are not included in the list of subscribed APNs; and if there are, then the MME also deactivates the packet data services that are being provided via an APN that is not included in the list of subscribed APNs and indicates an appropriate rejection cause to the mobile telephone.

Further details of the technical realization of ODB are described in version 11.1.0 of the 3GPP TS 23.015 standard, which is incorporated herein by reference.

In summary, the establishment of a packet data connection whilst ODB is in place may be rejected by the network (i.e. the MME) either due to mobility reasons (e.g. during roaming) or due to session related reasons (e.g. requested service or gateway) by using either EMM or ESM signalling, respectively.

CITATION LIST

Non Patent Literature

NPL 1: 3GPP TS 23.402 standards document
NPL 2: 3GPP TS 23.401 standards document
NPL 3: 3GPP TS 23.015 standards document

SUMMARY OF INVENTION

Technical Problem

However, when PDN services are rejected at the EMM level (e.g. during roaming), the mobile telephone is not allowed to access any APN whilst it remains in its currently visited network (e.g. VPLMN) since in this case the whole network is deemed to be forbidden for packet data services. It is therefore not possible for the mobile telephone to connect to any APN in its home network (HPLMN) or to connect to any APN provided by the visited network for roaming users.

On the other hand, when a requested PDN service is rejected by the network at the ESM level, the mobile telephone cannot determine whether the service, the bearer, the APN or perhaps all EPS services are being barred by the network. Therefore, the mobile telephone will most probably re-attempt to establish the rejected PDN service (and/or other services) which will result in unnecessary and excessive signalling between the mobile telephone and the network entities.

Accordingly, preferred embodiments of the present invention aim to provide methods and an apparatus which overcome or at least partially alleviate the above issues.

Although for efficiency of understanding for those of skill in the art, the invention will be described in detail in the context of a 3GPP system (UMTS, LTE), the principles of the invention can be applied to other systems in which mobile telephones or user equipment access packet data networks, such as the Internet, via a core network.

Solution to Problem

In a first aspect, the invention provides a network node for use in a communications system having a core network and at least one communications device, the network node including: means for generating control information for controlling access of said at least one communications device to packet data services using said core network, the control information identifying at least one gateway and indicating that said communications device is barred from using said at least one identified gateway; and means for communicating with said at least one communications device including means for communicating said generated control information.

The network node may further include means for obtaining subscription data from a home subscriber server, the subscription data indicating whether or not operator determined barring has been invoked for said communications device.

The subscription data may include a list of allowed gateways for said communications device. The subscription data may also include a list of barred gateways for said communications device.

The means for communicating with said at least one communications device may include sending at least one message formatted according to a non-access stratum 'NAS' signalling protocol. The message may include at least one of a 'PDN Connectivity Reject' message, a 'Deactivate EPS Bearer Context Request' message, an 'Attach Reject' message, 'TAU Reject' message, a 'Service Reject' message, and a 'Detach Request' message.

The control information identifying the gateway may include an access point name 'APN' and/or barring status information for the gateway. The control information may include an 'APN not allowed' or an 'APN not allowed due to ODB' or an 'Operator Determined Barring' rejection cause.

The core network may include a mobility management entity 'MME' or a serving GPRS support node 'SGSN' entity.

The network node may further include means for monitoring communications by said at least one communications device relating to packet data services. In this case, the generating means may generate the control information and the communicating means may communicate the control information to the at least one communications device upon said monitoring means indicating a communication attempt by said at least one communication device relating to packet data services using said at least one identified gateway.

The communication attempt may include a request for a new packet data service using said at least one identified gateway, in which case the control data may include a rejection of said communication attempt. Alternatively, the communication attempt may include communication relating to an existing packet data service using the identified gateway and the control data may include a termination of the existing packet data service using the identified gateway. The network node may also include means for instructing a network node controlling the identified gateway to terminate the existing packet data service.

In a second aspect, the invention provides a communications device for use in a communications system having a core network, the communications device including: means for accessing a packet data service using a gateway located in said core network; means for receiving control information from a core network entity; the control information identifying at least one gateway and indicating that said communications device is barred from using said at least one identified gateway; and means for configuring, based on said received control information, said means for accessing packet data services so that the means for accessing is prevented from attempting to access packet data services using said at least one identified gateway, whilst being permitted to attempt to access packet data services using other gateways.

The control information may be received in response to the accessing means sending a request, to said core network entity, for setting up a packet data service using a gateway located in the core network. The control information may be received when the request for setting up said packet data service is rejected by said core network entity. Alternatively, the control information may be received when the request for setting up said packet data service is allowed by the core network entity.

The core network may include a home network part and a visited network part and an identified gateway may be provided in the visited network part. At least one of the other gateways may be provided in the home network part.

The communications device may further include means for providing said control information, to said core network entity, identifying the gateway. The control information may identify said at least one gateway comprises an access point name 'APN'. The control information may further bar status information for said at least one gateway. The list of APNs may include barred gateways. The list of APNs may include allowed gateways. The control information receiving means may receive the control information in at least one message formatted according to a non-access stratum 'NAS' signalling protocol. The at least one message may include at least one of a 'PDN Connectivity Reject' message, a 'Deactivate EPS Bearer Context Request' message, an 'Attach Reject' message, 'TAU Reject' message, a 'Service Reject' message, and a 'Detach Request' message. The control information may include an 'APN not allowed' or an 'APN not allowed due to ODB' or an 'Operator Determined Barring' rejection cause.

The communications device may be a mobile communications device operating according to any one of the following standards: the evolved UMTS terrestrial radio access network 'E-UTRAN' standard, the General Packet Radio Service 'GPRS' standard or the wideband code division multiple access 'W-CDMA' standard. The core network comprises a mobility management entity 'MME' or a serving GPRS support node 'SGSN' entity.

The communications device may also include means for storing the received control information in a non-volatile memory, for example, a universal subscriber identity module 'USIM'.

In another aspect, the invention also provides a network node for use in a communications system having a core network and at least one communications device, the network node including a controller configured to: generate control information for controlling access of said at least one communications device to packet data services using said core network, the control information identifying at least one gateway and indicating that said communications device is barred from using said at least one identified gateway; and communicate said generated control information to said at least one communications device.

In yet another aspect, the invention also provides a communications device for accessing packet data services using a gateway located in a core network of a communications system, the communications device including a controller configured to: receive control information from a core network entity; the control information identifying at least one gateway and indicating that said communications device is barred from using said at least one identified gateway; and configure, based on said received control information, access to said packet data services so that the communications device is prevented from attempting to access packet data services using said at least one identified gateway, whilst being permitted to attempt to access packet data services using other gateways.

The invention also provides a home subscriber server including a list of subscribed gateways and information identifying at least one subscribed gateway (APN) for which operator determined barring is being invoked.

The invention also provides a communications system including the above described network node; the above described communications device; at least one gateway (APN); and the above described home subscriber server.

The invention also provides a method performed by a network node in a communications system having a core network and at least one communications device, the method including: generating control information for controlling access of said at least one communications device to packet data services using said core network, the control information identifying at least one gateway and indicating that said communications device is barred from using said at least one identified gateway; and communicating with said at least one communications device including communicating said generated control information.

The invention also provides a method performed by a communications device for accessing packet data services using a gateway located in a core network of a communications system, the method including: receiving control information, from a core network entity; the control information identifying at least one gateway and indicating that said communications device is barred from using said at least one identified gateway; and configuring, based on said received control information, access to said packet data services so that the communications device is prevented from attempting to access packet data services using said at least one identified gateway, whilst being permitted to attempt to access packet data services using other gateways.

The invention also provides, for all methods disclosed, corresponding computer programs or computer program products for execution on corresponding user equipment or network communications devices.

Advantageous Effects of Invention

According to the present invention, it can be achieved to provide methods and an apparatus which overcome or at least partially alleviate the above issues.

BRIEF DESCRIPTION OF DRAWINGS

Embodiments of the invention will now be described, by way of example, with reference to the accompanying drawings in which.

DESCRIPTION OF EMBODIMENTS (Overview)

Figure 1:
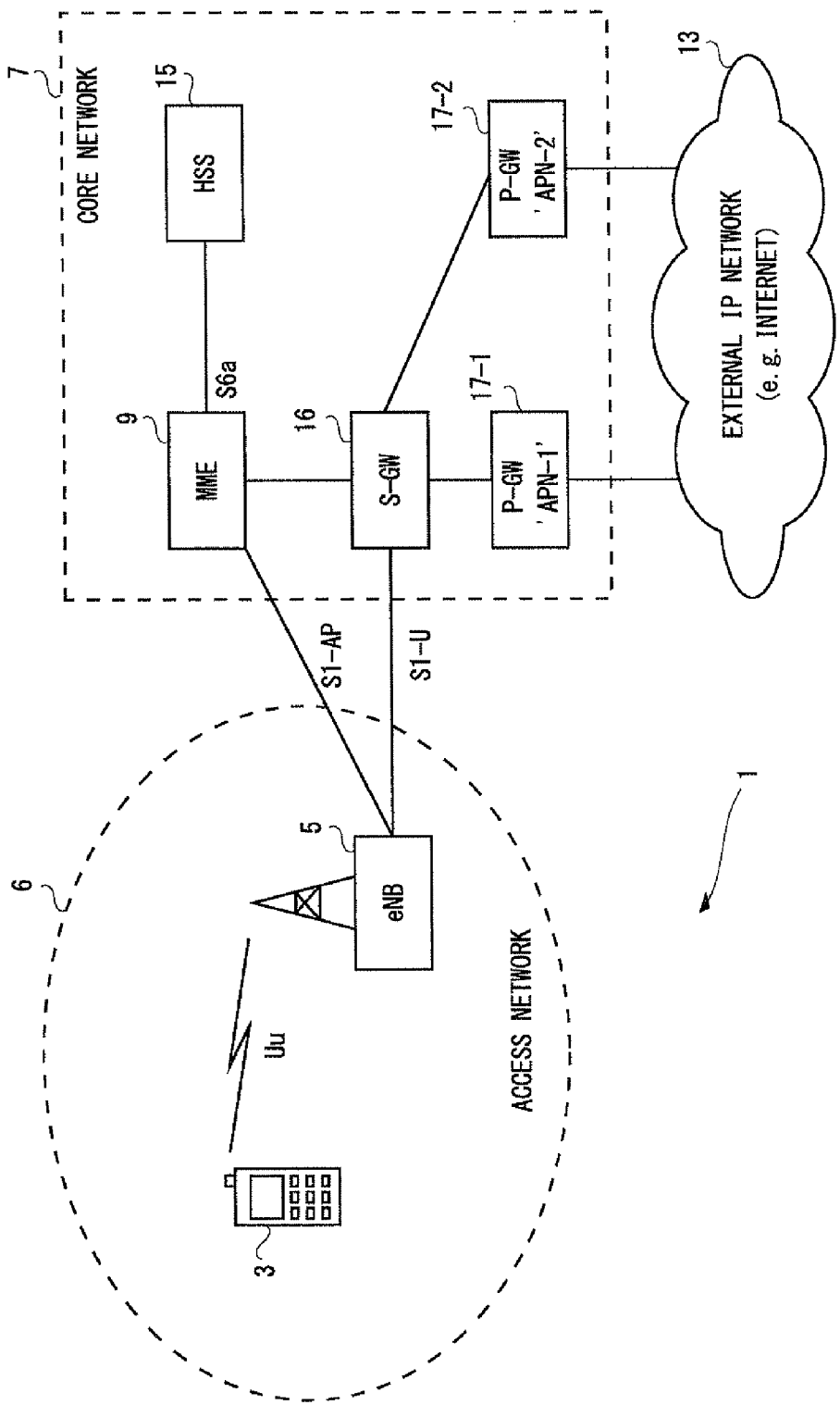
FIG. 1 illustrates schematically a cellular telecommunications system to which embodiments of the invention may be applied.

FIG. 1 schematically illustrates a telecommunications system 1 in which users of mobile telephones 3 can communicate with each other and other users via E-UTRAN base stations 5 and a core network 7 using an E-UTRAN radio access technology (RAT). As those skilled in the art will appreciate, whilst one mobile telephone 3 and one base station 5 are shown in FIG. 1 for illustration purposes, the system, when implemented, will typically include other base stations and mobile telephones.

As is well known, a mobile telephone 3 may enter and leave the areas (i.e. radio cells 6) served by the base stations 5 as the mobile telephone 3 is moving around in the geographical area covered by the telecommunications system 1. In order to keep track of the mobile telephones 3 and to facilitate movement between the different base stations 5, the core network 7 includes a mobility management entity (MME) 9 which is in communication with the base stations 5 coupled to the core network 7.

The base station 5 is connected to the MME 9 via an "S1-AP" interface, also known as an "S1-MME" interface, which is defined in the 3GPP TS 36.413 standard. The MME 9 is also connected to the home subscriber server (HSS) 15 via the so-called "S6a" interface. For each mobile telephone 3, the HSS 15 stores the subscription data (such as settings and preferences) and the authorizations for accessing the core network 7 and packet data services associated with that mobile telephone 3. The HSS 15 maintains a list of subscribed APNs for mobile terminal 3. Each APN in the subscribed APNs list may have an attribute indicating whether or not that particular APN is barred by the operator (ODB status). Data stored in the HSS 15 (including any ODB per APN status) may be updated, if necessary, by an operation and maintenance entity (not shown). The HSS 15 provides updated subscriber data (also known as user context), that includes a list of subscribed APNs and possibly their respective ODB status (or alternatively the HSS 15 includes a list of subscribed APNs that are not barred, i.e. list of APNs which no ODB is currently being invoked for), to the MME 9 (e.g. periodically and/or upon changes and/or upon request), which uses it for managing connections between the mobile telephone 3 and the core network 7. The HSS 15 may thus indicate to the MME 9 ODB status of all APNs either explicitly or implicitly. A gateway is deemed to be barred if it is included in a list of barred APNs and/or if it has an ODB status indicator indicating active operator determined barring and/or if it is excluded from a list of allowed/subscribed APNs.

The mobile telephone 3 and the base station 5 are connected via an air interface, the so-called "Uu" interface, and the base station 5 and the serving gateway (S-GW) 16 are connected via an "S1-U" interface. From the core network 7, connection to an external IP network 13, such as the Internet, is provided via one or more packet data network gateways (P-GWs) 17-1 and 17-2 linked to the SGW 16. The MME 9 is also connected to the S-GW 16 for managing the EPS Bearer(s) between the mobile telephone 3 and the corresponding P-GW(s) 17. It will be appreciated that, whilst shown as separate entities, P-GWs 17-1 and 17-2 might be implemented as logical entities, and could thus be part of a single physical unit. Furthermore, the functionalities of the S-GW 16 and the P-GWs 17-1 and 17-2 could also be implemented in a single gateway element.

Whenever the mobile telephone 3 is powered up in (or registered to) an area served by the MME 9, it informs the MME 9 about its current location (i.e. the current area) using NAS signalling. The mobile telephone 3 also sets up an appropriate EPS bearer with the core network 7 so that it can be reached via the current base station 5. In order to access packet data services via one or more gateways/access points, the mobile telephone 3 also initiates PDN connectivity procedures with the MME 9 and may provide the APN(s) it needs to access. At this stage, the mobile telephone 3 may not be aware of operator determined barring invoked for some or all packet data services.

However, the MME 9 serving the mobile telephone 3 obtains and stores an up-to-date list of subscribed APNs for this mobile telephone 3 from the HSS 15. Therefore, if the MME 9 finds that any of the APNs that the mobile telephone 3 attempts to connect to are not included in the list of subscribed APNs for this mobile telephone (or it is included in a list of barred APNs), it rejects establishment of connection by this mobile telephone 3 to such APNs. To do so, the MME 9 sends an appropriate PDN connectivity response, i.e. a specially formulated EMM/ESM message, and also includes an appropriate rejection cause in this message. Similarly, if this mobile telephone 3 has any existing connection to such non-subscribed APNs, the MME 9 terminates this connection by sending an appropriate PDN connectivity rejection message and includes the rejection cause in that message. The rejection cause informs the mobile telephone 3 about the reason for the rejection, so that an appropriate message can be displayed to inform the user of this mobile telephone 3, and so that further attempts to connect the mobile telephone 3 to this APN can be avoided, which is advantageous.

More specifically, in this embodiment, the message sent by the MME 9 to the mobile telephone 3 uses ESM/EMM signalling and includes an 'Operator Determined Barring' or an 'APN not allowed due to ODB' or an 'APN not allowed' rejection cause, which informs the mobile telephone 3 that it should not reattempt to connect to the same APN, at least until the mobile telephone 3 has been switched off or until the subscriber identity module (SIM card/USIM) has been removed/replaced. This will have the advantage of preventing the mobile telephone 3 from sending further PDN connectivity requests with respect to this APN.

In a variation of this example, when rejecting/terminating the PDN connection to a barred APN, the MME 9 sends a list of allowed and/or barred APNs to the mobile telephone 3. The MME 9 may send such a list of allowed and/or barred APNs instead of or in addition to the appropriate rejection cause. This will have the advantage of preventing the mobile telephone 3 from sending further PDN connectivity requests with respect to any of the barred APNs, whilst also indicating to the mobile telephone 3 which APNs may still be used by this subscriber.

The above examples thus have the benefit of preventing wasteful use of system resources both over the air interface and between the mobile telephone 3 and the MME 9 due to repeated attempts to connect the mobile telephone 3 to barred APNs.

Figure 2:
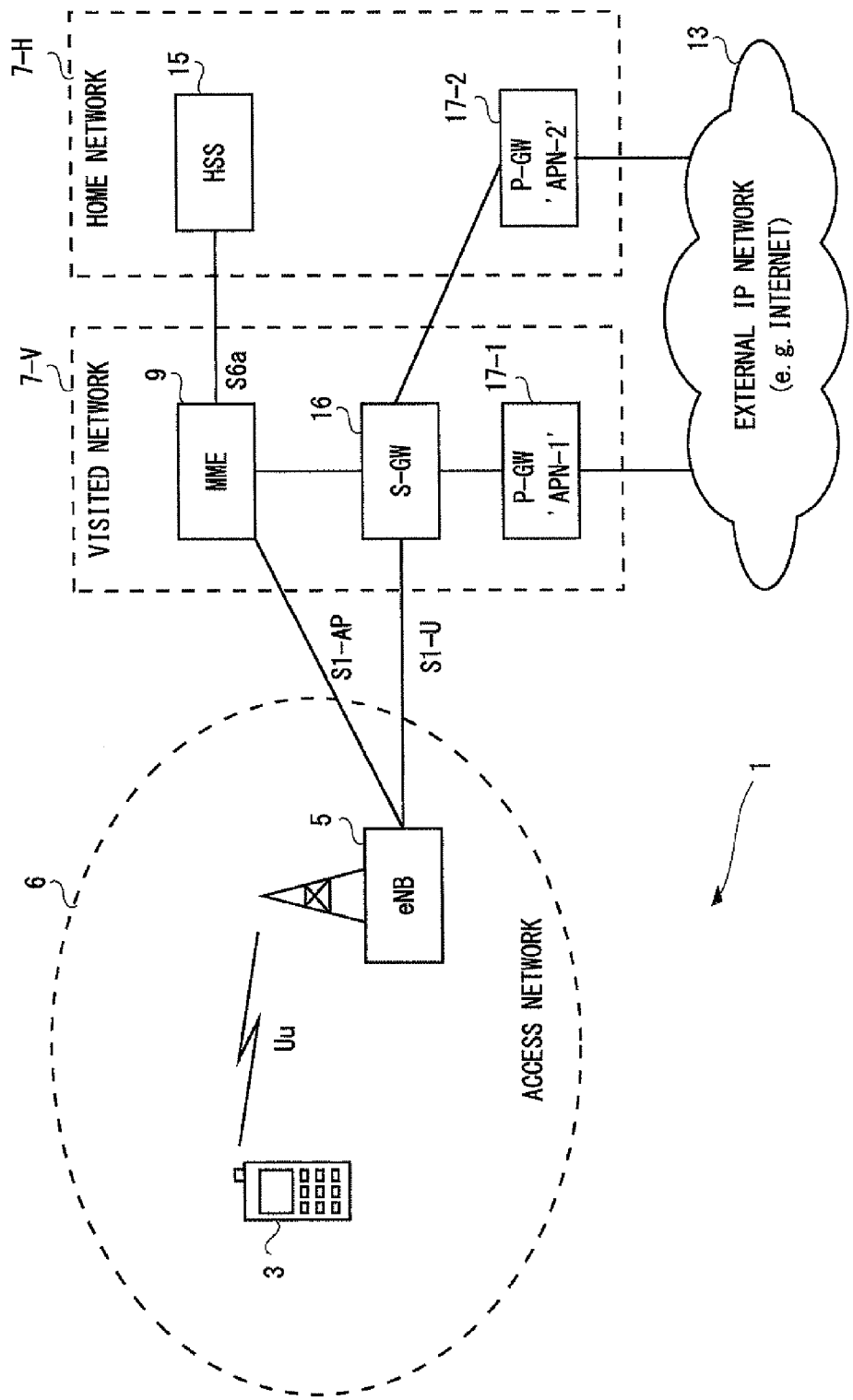
FIG. 2 illustrates schematically another cellular telecommunications system to which embodiments of the invention may be applied.

FIG. 2 schematically illustrates another cellular telecommunications system 1 to which embodiments of the invention may be applied. In this case, the mobile telephone 3 is currently roaming in a VPLMN. The core network functionalities (for this user) are thus shared between a visited network 7-V (which includes the MME 9, the S-GW 16, and at least one P-GW 17-1) and a home network 7-H (which includes the HSS 15 and at least one additional P-GW 17-2). Although in this case some of the previously described network entities are located in and operated by different providers, due to the standardized interfaces employed between these entities (i.e. Uu, S1-AP, S6a, etc.), embodiments of the invention can be applied irrespective of the current network of the mobile telephone (i.e. visited or home; roaming or not) and irrespective of the operator of any of the network entities.

(Mobile Telephone)

Figure 3:
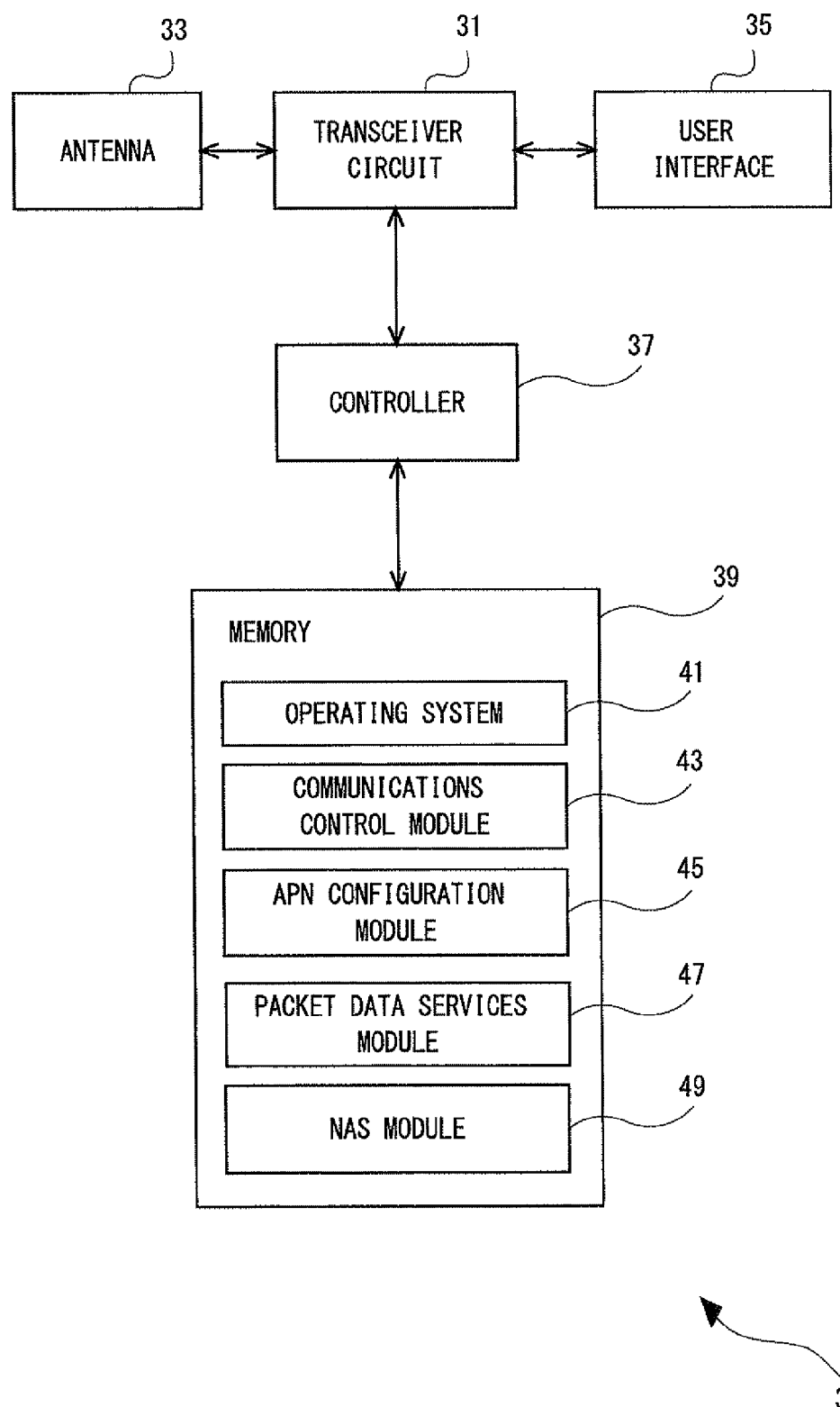
FIG. 3 is a block diagram of a mobile telephone forming part of the system shown in FIG. 1 and FIG. 2.

FIG. 3 is a block diagram illustrating the main components of the mobile telephone 3 shown in FIG. 1 and FIG. 2. As shown, the mobile telephone 3 has a transceiver circuit 31 that is operable to transmit signals to and to receive signals from a base station 5 via one or more antenna 33. The mobile telephone 3 has a controller 37 to control the operation of the mobile telephone 3. The controller 37 is associated with a memory 39 and is coupled to the transceiver circuit 31. Although not necessarily shown in FIG. 3, the mobile telephone 3 may of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via, for example, the telecommunications system or from a removable data storage device (RMD), for example.

The controller 37 is configured to control overall operation of the mobile telephone 3 by, in this example, program instructions or software instructions stored within the memory 39. As shown in FIG. 3, these software instructions include, among other things, an operating system 41, a communications control module 43, an APN configuration module 45, a packet data services module 47, and a non-access stratum (NAS) module 49.

The communications control module 43 is operable to control the communication between the mobile telephone 3 and the base station 5. The communications control module 43 also controls the separate flows of uplink data and control data that are to be transmitted to the base station 5.

The APN configuration module 45 is operable to configure an appropriate gateway for packet data services used by the mobile telephone 3. If operator determined barring is in place with respect to a particular APN, the APN configuration module 45 is operable to prevent connection attempts to the gateway identified by that access point name.

The packet data services module 47 is operable to manage packet data services and communicate user data via the gateways configured by the APN configuration module 45.

The non-access stratum module 49 is operable to send and receive control data to/from the core network 7 (e.g. the MME 9) using Layer 3 signalling. For example, the NAS module 49 is operable to receive EMM and/or ESM signalling from the MME 9 that includes a rejection cause for a PDN connection (and optionally, also includes a list of barred/subscribed APNs). The NAS module 49 is further operable to provide information to the APN configuration module 45 on any operator determined barring invoked for this subscriber (e.g. any barred APN).

(Mobility Management Entity)

Figure 4:
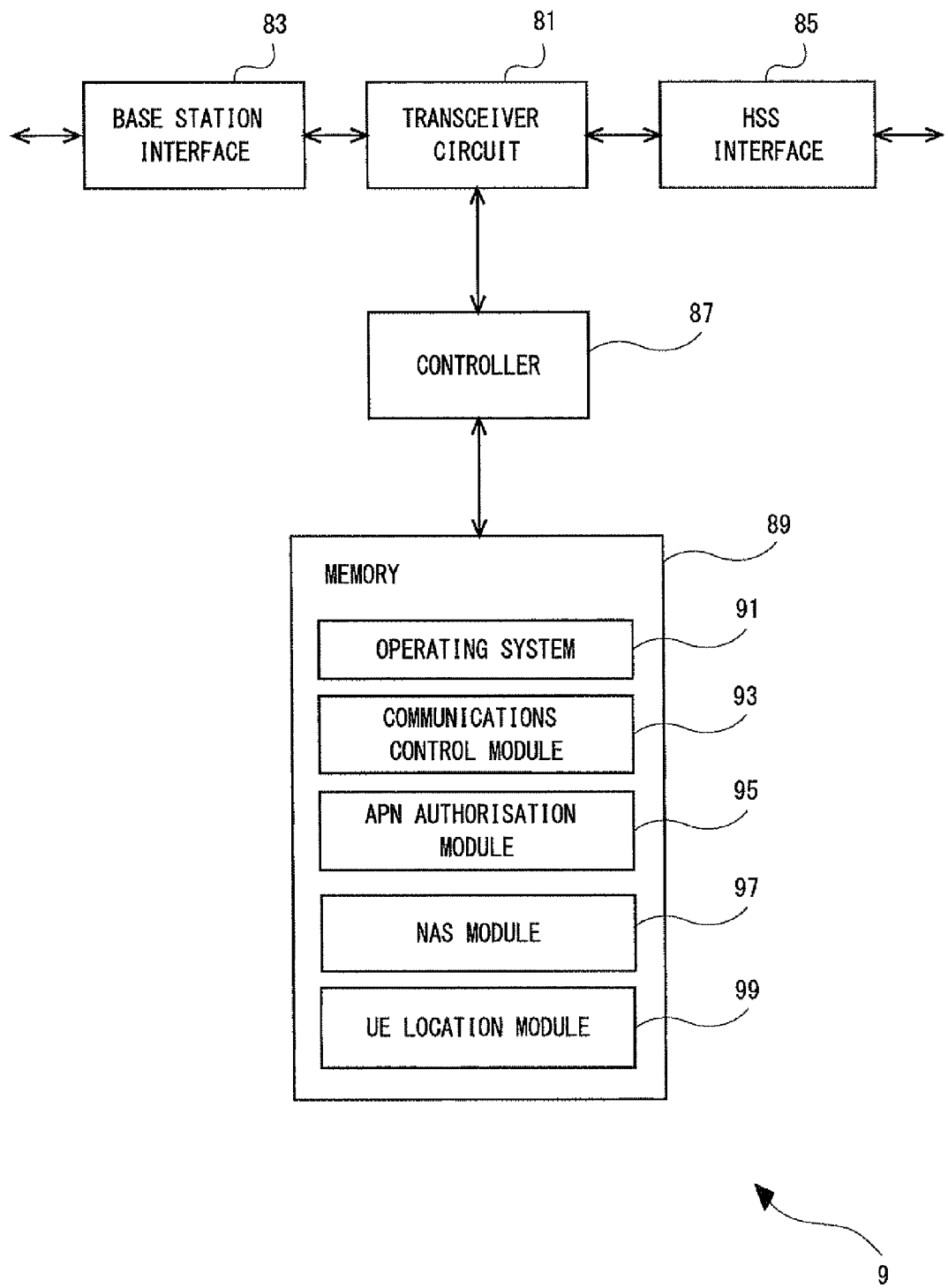
FIG. 4 is a block diagram of a mobility management entity (MME) forming part of the system shown in FIG. 1 and FIG. 2.

FIG. 4 is a functional block diagram illustrating the main components of the mobility management entity 9 shown in FIG. 1 and FIG. 2. As shown in this FIG. 4, the MME 9 includes a transceiver circuit 81 which is operable to transmit signals to, and to receive signals from the base station 5 via a base station interface 83 and the home subscriber server 15 via an HSS interface 85, respectively. The operation of the transceiver circuit 81 is controlled by a controller 87 in accordance with software stored in a memory 89. The software includes, among other things an operating system 91, a communications control module 93, an APN authorization module 95, a NAS module 97, and a UE location module 99.

The communications control module 93 is operable to control the communication between the MME 9 and other entities, such as the HSS 15, and the mobile telephone 3 (via the base station 5).

The APN authorization module 95 is operable to obtain (from the HSS 15) and enforce configuration of gateways for the mobile telephones 3 served by this MME 9. For example, the APN authorization module 95 is operable to prevent the mobile telephone 3 from accessing packet data services via a gateway that is indicated by the HSS 15 as being barred (e.g. a gateway that is included in a list of barred APNs and/or having an ODB status indicator indicating operator determined barring and/or excluded from a list of allowed/subscribed APNs). To this effect, the APN authorization module 95 is operable to inform (via the NAS module 97) the mobile telephone 3 about an operator determined barring invoked with respect to the APN that the mobile telephone 3 is accessing (or trying to access).

The non-access stratum module 97 is operable to send and receive control data to/from the corresponding non-access stratum module 49 of the mobile telephone 3 using Layer 3 signalling. For example, the NAS module 97 is operable to send EMM and/or ESM signalling that includes a rejection cause for a PDN connection (and optionally, also includes a list of barred/subscribed APNs).

The UE location module 99 is operable to provide, to the HSS 15, information on the current location of the mobile telephones 3 served by this MME 9. The UE location module 99 is also operable to obtain default configuration data (such as a default APN) for the current location of the mobile telephone 3 and to provide such obtained configuration data to the other modules (e.g. the APN authorization module 95) as appropriate.

(Home Subscriber Server)

Figure 5:
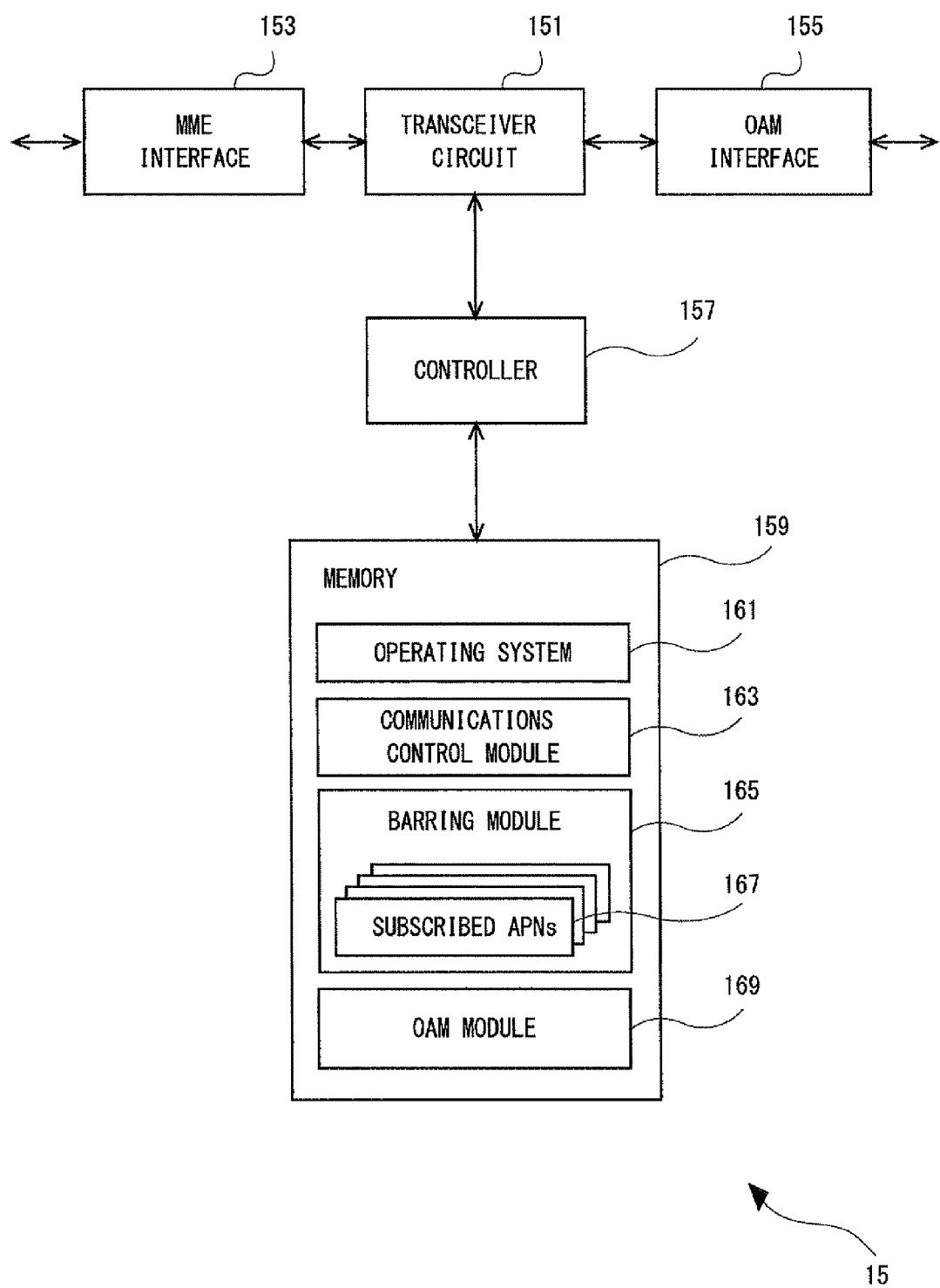
FIG. 5 is a block diagram of a home subscriber server (HSS) forming part of the system shown in FIG. 1 and FIG. 2.

FIG. 5 is a functional block diagram illustrating the main components of the home subscriber server 15 shown in FIG. 1 and FIG. 2. As shown in this fig., the home subscriber server 15 includes a transceiver circuit 151 which is operable to transmit signals to, and to receive signals from the other network entities, such as the mobility management entity 9, via an MME interface 153 and an operation and maintenance entity via an OAM interface 155, respectively. The operation of the transceiver circuit 151 is controlled by a controller 157 in accordance with software stored in memory 159. The software includes, among other things, an operating system 161, a communications control module 163, a barring module 165 (which includes a list of subscribed APNs 167 for each subscriber that is served by this HSS 15), and an operation and maintenance (OAM) module 169.

The communications control module 163 is operable to control the communication between the HSS 15 and other entities, such as the MME 9, and the operation and maintenance entity.

The barring module 165 is operable to hold configuration data (and to provide such data to other network entities, e.g. the MME 9) for each subscriber about currently invoked barring with respect to access points, services, IP addresses, phone numbers, and the like. In particular, the barring module 165 stores a list of currently subscribed APNs 167 for each subscriber that is served by this HSS 15.

The operation and maintenance module 169 is operable to communicate with the operation and maintenance entity for obtaining updated configuration data for the subscribers that this HSS 15 serves. For example, the operation and maintenance module 169 is operable to obtain a current and/or default list of subscribed APNs 167 for each subscriber and to provide this list to the barring module 165 as appropriate.

In the above description, the mobile telephone 3, the mobility management entity 9, and the home subscriber server 15 are described for ease of understanding as having a number of discrete modules (such as the communications control modules and the non-access stratum modules etc.). Whilst these modules may be provided in this way for certain applications, for example, where an existing system has been modified to implement the invention, in other applications, for example, in systems designed with the inventive features in mind from the outset, these modules may be built into the overall operating system or code, and so these modules may not be discernible as discrete entities. These modules may also be implemented in software, hardware, firmware or a mix of these.

(Operation)

Figure 6:
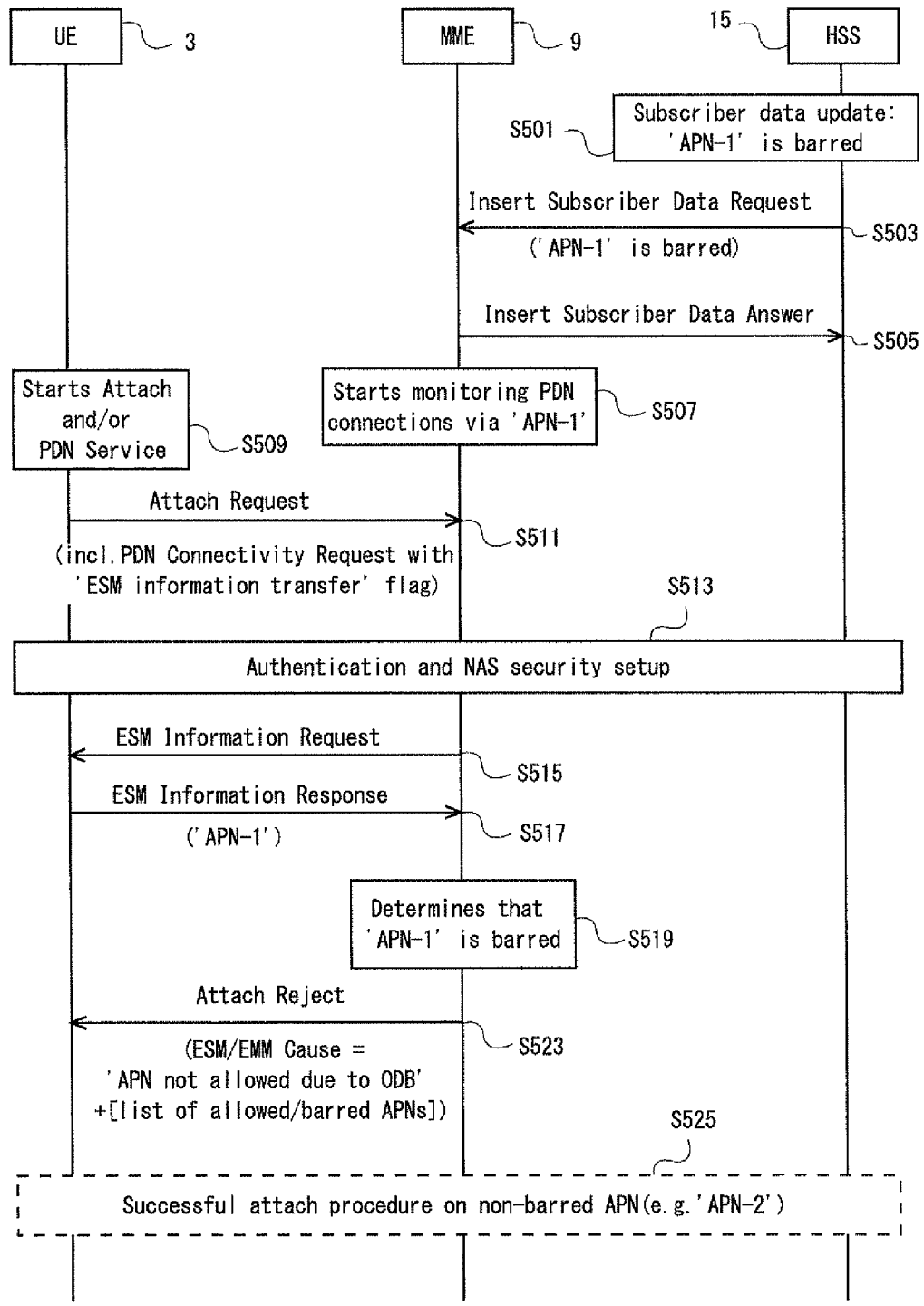
FIG. 6 is a signalling diagram indicating a procedure by which the MME controls PDN access for a mobile telephone forming part of the system shown in FIG. 1 and FIG. 2.

FIG. 6 is a signalling diagram indicating a procedure by which the MME 9 controls PDN access for a mobile telephone 3 forming part of the system 1 shown in FIG. 1 and FIG. 2.

Initially, the mobile telephone 3 is not aware of any operator determined barring, e.g. because the mobile telephone 3 does not have any on-going packet data connection or because such barring has not been invoked yet for this subscriber. However, the mobile telephone 3 might have already been registered with the network and/or might be using other services (e.g. a circuit switched call).

In step s501, the HSS 15 obtains a subscriber data update (e.g. using its OAM module 169), which indicates that operator determined barring has been invoked for a gateway (or services) identified as 'APN-1'. The HSS 15 stores the updated subscriber data in its memory 159 and updates the list of subscribed APNs 167 for this subscriber accordingly. For example, the HSS 15 may mark a gateway as being barred by including it in a list of barred APNs and/or by changing its ODB status indicator to indicate invoked operator determined barring and/or by removing it from any previous list of allowed/subscribed APNs. The subscriber for which ODB is invoked may be identified by a suitable identifier which is also known to the MME 9 currently serving this subscriber.

In response to the subscriber data update, the HSS 15 informs the MME 9 serving this subscriber that ODB has been invoked for APN-1. As this effect, the HSS 15 generates and sends, at step S503, an 'Insert Subscriber Data Request' message to the MME 9 and includes in this message the name of the gateway/access point being barred, in this example, 'APN-1'. The message also includes an identification of the subscriber that it concerns.

Upon receipt of the 'Insert Subscriber Data Request' message, the MME 9 updates its APN authorization module 95 by marking the indicated 'APN-1' as being barred for the subscriber identified in the received message. Then, in step S505, the MME 9 confirms receipt of the previous message by generating and sending an 'Insert Subscriber Data Answer' message back to the HSS 15.

In step S507, using the updated APN configuration data, the MME 9 starts monitoring for PDN connections of this subscriber via the barred 'APN-1' gateway. Since at this point there is no on-going packet data service involving 'APN-1' and the mobile telephone 3 of the identified subscriber, the MME 9 does not need to enforce the new ODB yet.

When the user of the mobile telephone 3 decides to use packet data services, the PDN module 47 of the mobile telephone 3 loads and starts up an appropriate PDN service application, as indicated at step S509. In response to this, the PDN module 47 instructs the NAS module 49 to set up a suitable PDN connection with the core network 7. Therefore, the NAS module 49 generates and sends, at step S511, an appropriate NAS message to the corresponding NAS module 97 of the MME 9 (via the base station 5, although not shown in FIG. 6). In this example, since the mobile telephone 3 has not been registered with the core network 7 yet, the message sent at S511 is an 'Attach Request' message which includes a 'PDN Connectivity Request' with an 'ESM information transfer' flag. This flag indicates to the MME 9 that the mobile telephone 3 needs to transmit ESM information (APN, etc.) to the MME 9 (once NAS security procedures have been completed).

Therefore, upon receiving the NAS message with the 'ESM information transfer' flag, the MME 9 initiates, at step S513, authentication and NAS security setup procedures for this mobile telephone 3. These procedures also involve the HSS 15. Since the mobile telephone 3 indicated that it has ESM information to transmit to the MME 9, the NAS module 97 generates and sends, at step S515, an 'ESM Information Request' message to the mobile telephone 3. The NAS module 49 of the mobile telephone 3 obtains the required APN configuration data from the APN configuration module 45, then generates and sends, at S517, an 'ESM Information Response' message to the MME 9. The NAS module 49 also includes in this message an identification of the gateway required for the desired PDN service, i.e. in this example 'APN-1'.

The NAS module 97 of the MME 9 forwards the received gateway identification (i.e. 'APN-1') to the APN authorisation module 95. At step S519, using this identification and the subscriber data previously received from the HSS 15, the APN authorization module 95 determines that the requested 'APN-1' is currently barred for the subscriber presently operating this mobile telephone 3. Therefore, it instructs the NAS module 97 to reject the request received at S511 and to inform the mobile telephone 3 about the ODB in place.

The NAS module 97 thus generates and sends, at S523, an 'Attach Reject' message to the mobile telephone 3 (to be received by its corresponding NAS module 49) and includes in this message an appropriate rejection cause, i.e. 'APN not allowed due to ODB'. The NAS module 97 may use, for example, either ESM (e.g. a rejection cause in the 'PDN Connectivity Reject' message which is included in the 'Attach Reject' message) or EMM signalling (e.g. rejection cause directly in the 'Attach Reject' message). Optionally, 1 the NAS module 97 might also include in the 'Attach Reject' message (or in a subsequent message or in the 'PDN Connectivity Reject' message) a list of barred and/or allowed (i.e. currently subscribed) APNs, if such list is available at the MME 9.

The 'Attach Reject' message sent at S523 will have the advantage of causing the mobile telephone 3 to reconfigure its APN configuration module 45 such that any subsequent attempts to establish a PDN connection via the barred 'APN-1' will be prevented. Preferably, the mobile telephone 3 will not attempt to request any PDN service via such barred gateway until at least the USIM has been replaced and/or the mobile telephone 3 has been switched off and on and/or until a further communication from the MME 9 informing the mobile telephone 3 that ODB has been revoked for this subscriber/gateway.

Finally, at step S525, the mobile telephone 3 may re-attempt establishment of the previously requested PDN service via another, non-barred gateway, for example 'APN-2'. Information on such a non-barred gateway may be stored in memory 39 or obtained from the MME 9 at S523.

Figure 7:
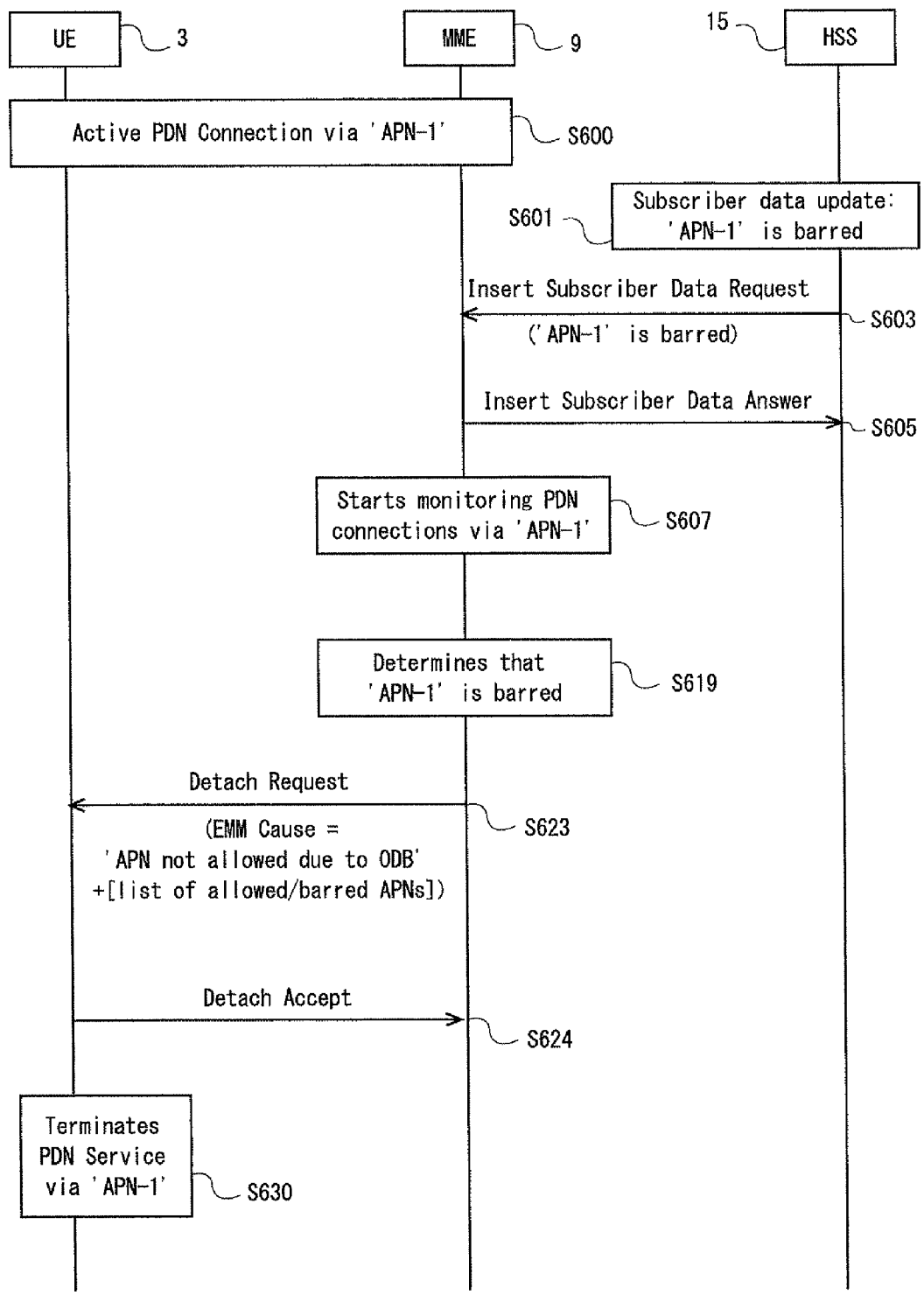
FIG. 7 is a signalling diagram indicating another procedure by which the MME controls PDN access for a mobile telephone forming part of the system shown in FIG. 1 and FIG. 2.

FIG. 7 is a signalling diagram indicating another procedure by which the MME 9 controls PDN access for a mobile telephone 3 forming part of the system 1 shown in FIG. 1.

In this example, the mobile telephone 3 already has an active PDN connection via a gateway known as 'APN-1' (step S600).

In step S601, the HSS 15 obtains a subscriber data update (e.g. using its OAM module 169), which indicates that operator determined barring has been invoked for gateway 'APN-1', i.e. the one that is currently used by the mobile telephone 3.

In response to the subscriber data update, the HSS 15 informs the MME 9 serving this subscriber that ODB has been invoked for APN-1. As this effect, the HSS 15 generates and sends, at step S603, an 'Insert Subscriber Data Request' message to the MME 9 and includes in this message the name of the gateway/access point being barred, i.e. 'APN-1'.

Upon receipt of the 'Insert Subscriber Data Request' message, the MME 9 updates its APN authorization module 95 by marking the indicated 'APN-1' as being barred for the subscriber identified in the received message. Then, in step S605, the MME confirms receipt of the previous message by generating and sending an 'Insert Subscriber Data Answer' message back to the HSS 15.

In step S607, using the updated APN configuration data, the MME 9 starts monitoring for PDN connections of this subscriber via the barred 'APN-1' gateway. At step S619, the MME 9 (e.g. its APN authorization module 95) determines that there is an on-going packet data service involving 'APN-1' and the mobile telephone 3, and thus the MME 9 proceeds to enforce the new ODB for this mobile telephone 3.

Therefore, the NAS module 97 generates and sends, at S623, a 'Detach Request' message to the mobile telephone 3 (to be received by its corresponding NAS module 49) and includes in this message an appropriate rejection cause, i.e. 'APN not allowed due to ODB'. Optionally, the NAS module 97 might also include in the 'Detach Request' message (or in a subsequent message) a list of barred and/or allowed (i.e. currently subscribed) APN, if such list is available at the MME 9s.

The mobile telephone 3 responds using a 'Detach Accept' message, at step S624, and then terminates any on-going packet data service via the barred 'APN-1', at step S630.

As in the previous example, the 'Detach Request' message sent at S623 will have the advantage of causing the mobile telephone 3 to reconfigure its APN configuration module 45 such that any subsequent attempts to establish a PDN connection via the barred 'APN-1' will be prevented. Preferably, the mobile telephone 3 will not attempt to request any PDN service via such barred gateway until at least the USIM has been replaced and/or the mobile telephone 3 has been switched off and on and/or until further communication from the MME 9 informing the mobile telephone 3 that ODB has been revoked for this subscriber/gateway. The mobile telephone 3 may then consider if there are any other APNs that can provide the same service and that is not barred. If there is, then the mobile telephone 3 may send a request to establish the previous service using the other APN.

Figure 8:
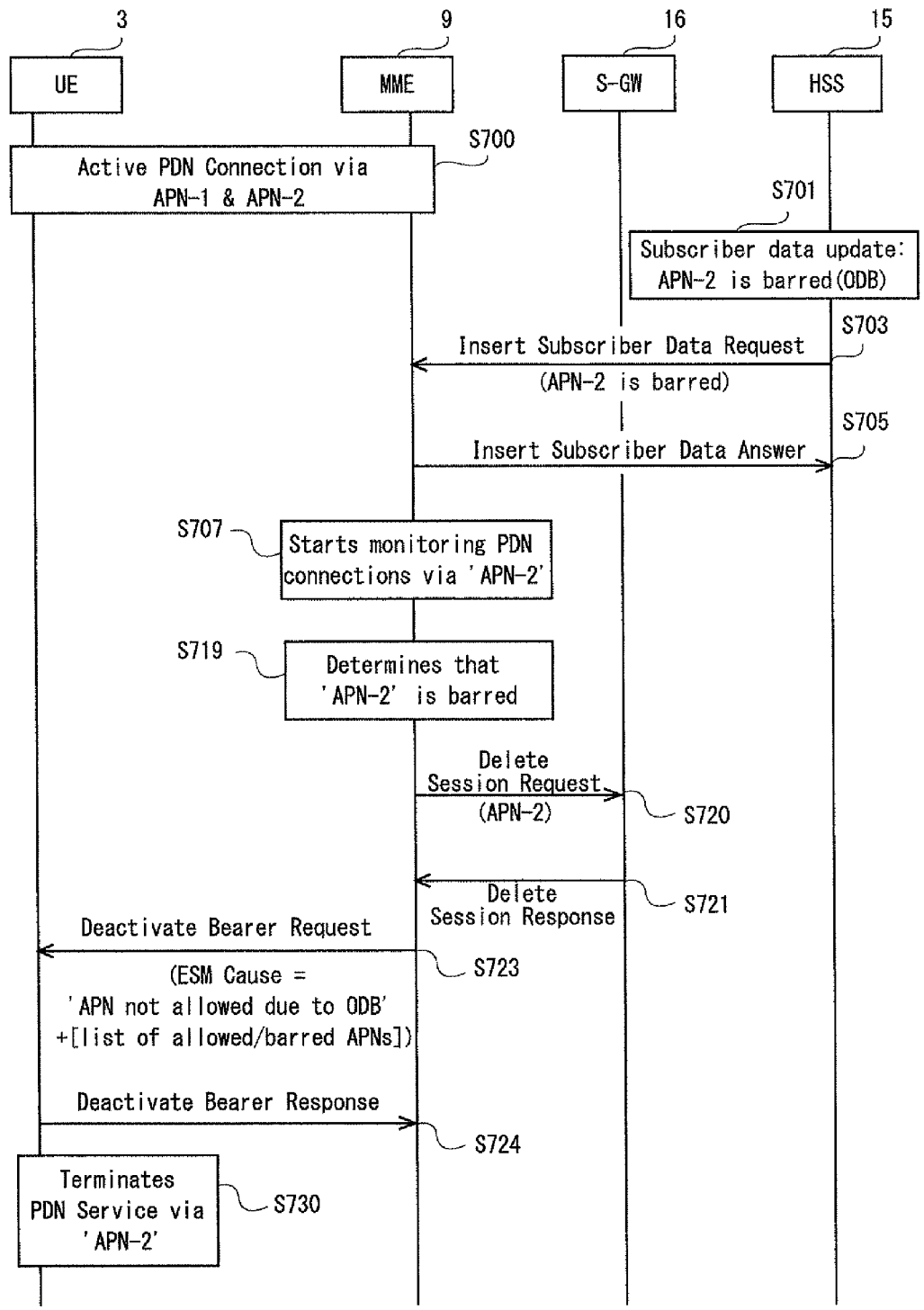
FIG. 8 is a signalling diagram indicating a variation on the procedure shown in FIG. 7.

FIG. 8 is a signalling diagram indicating a variation on the procedure shown in FIG. 7. However, in this example, the mobile telephone 3 initially has active PDN connections via both 'APN-1' and 'APN-2'. FIG. 8 also shows the serving gateway 16 managing the connection between the mobile telephone 3 and PDN gateway 17-2 (i.e. 'APN-2').

Similarly to the example described with reference to FIG. 7, the procedure starts when the HSS 15 obtains, at step s701, a subscriber data update for the user of the mobile telephone 3. In this example, however, it is 'APN-2' which becomes barred due to operator determined barring rather than 'APN-1'.

Nevertheless, at steps s703 and s705, the updated ODB information is provided to the MME 9 using the previously described 'Insert Subscriber Data Request' and 'Insert Subscriber Data Answer' messages. In this case, the 'Insert Subscriber Data Request' also includes the name of the gateway/access point being barred, i.e. 'APN-2'.

Next, in step S707, the MME 9 starts monitoring for PDN connections of this subscriber via the barred 'APN-2' gateway and at step S719, the APN authorization module 95 determines that there is an on-going packet data service involving the barred 'APN-2' gateway and the mobile telephone 3.

However, since this mobile telephone 3 has another active PDN connection via a non-barred gateway as well, instead of generating and sending a 'Detach Request' as in the previous example, the MME 9 proceeds to initiate termination of the barred PDN connection only (i.e. the active PDN connection via the gateway 'APN-2').

Therefore, the MME 9 informs both the S-GW 16 controlling the P-GW 17-2 known as 'APN-2' and the mobile telephone 3 using the PDN services via 'APN-2'.

First, the NAS module 97 generates and sends, at S720, a 'Delete Session Request' message to the S-GW 16 and includes in this message information identifying the P-GW 17-2 (i.e. 'APN-2') that this message concerns. The S-GW 16 will in turn initiate termination of the connection at the P-GW 17-2 and confirms this with the MME 9, by generating and sending a 'Delete Session Response' message, at step S721.

The NAS module 97 also generates and sends, at S723, a 'Deactivate Bearer Request' message to the mobile telephone 3 (to be received by its corresponding NAS module 49) and includes in this message an appropriate rejection cause, i.e. 'APN not allowed due to ODB' along with an identification of the gateway and/or the bearer that is routed via that gateway.

The mobile telephone 3 responds using a 'Deactivate Bearer Response' message, at step S724, and then terminates its on-going packet data service via the barred 'APN-2', at step S730.

As in the previous example, the 'Deactivate Bearer Request' message at S723 will have the advantage of causing the mobile telephone 3 to reconfigure its APN configuration module 45 such that any subsequent attempts to establish a PDN connection via the barred 'APN-2' will be prevented, whilst still maintaining its active PDN connection via other, non-barred gateways, such as 'APN-1'.

Figure 9:
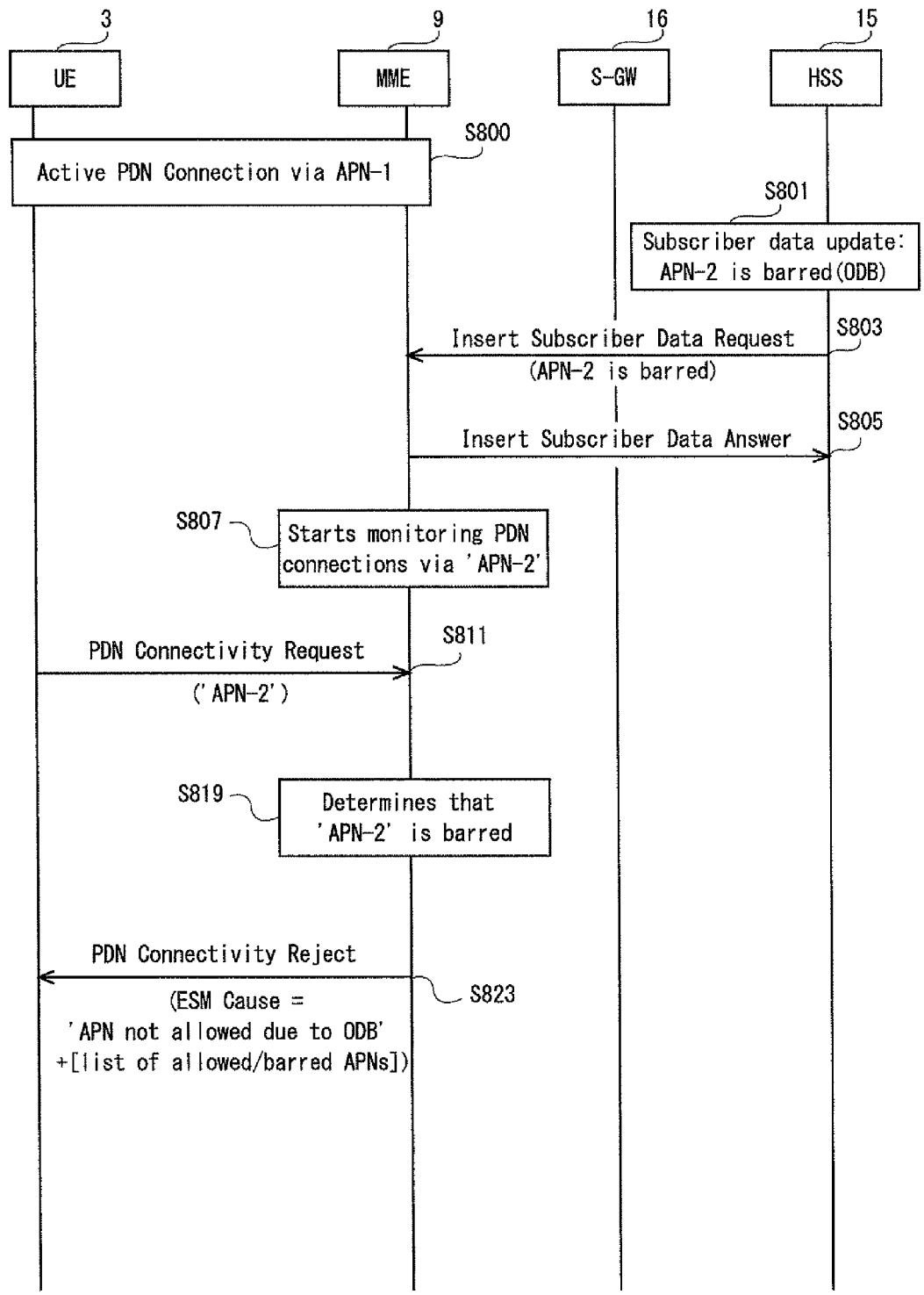
FIG. 9 is a signalling diagram indicating yet another procedure by which the MME controls PDN access for a mobile telephone forming part of the system shown in FIG. 1 and FIG. 2.

FIG. 9 is a signalling diagram indicating yet another procedure by which the MME 9 controls PDN access for a mobile telephone 3 forming part of the system 1 shown in FIG. 1 and FIG. 2. In this example, operator determined barring is invoked in the HSS for a gateway that the mobile telephone 3 is not yet connected to.

The mobile telephone 3 in this example has an active PDN connection, as shown generally at step S800, via a gateway identified as 'APN-1'. As described above, ODB may be invoked in the HSS 15 for a particular gateway, here 'APN-2', during subscriber data update at step S801. As shown at steps S803 and S805, the HSS 15 also informs the MME 9 about the invoked ODB function for the subscriber operating the mobile telephone 3, which causes the MME 9 to start monitoring (at S807) for PDN connections by this mobile telephone 3 via the barred 'APN-2' gateway.

Therefore, when at step S811 the mobile telephone 3 sends a subsequent 'PDN Connectivity Request' for this 'APN-2' gateway, the MME 9 (i.e. its APN authorization module 95) determines, at step S819, that the requested access point is barred for this subscriber.

Similarly to the previous examples, when the MME 9 rejects the mobile telephone's 3 connection attempt to the barred 'APN-2', at S823, it includes in the sent 'PDN Connectivity Reject' message the appropriate rejection cause, i.e. 'APN not allowed due to ODB', and optionally, the list of currently subscribed/barred APNs.

As in the previous example, the message at S823 will have the advantage of causing the mobile telephone 3 to reconfigure its APN configuration module 45 such that any subsequent attempts to establish a PDN connection via the barred 'APN-2' will be prevented, whilst still maintaining its active PDN connection via other, non-barred gateways, such as 'APN-1'.

Figure 10:
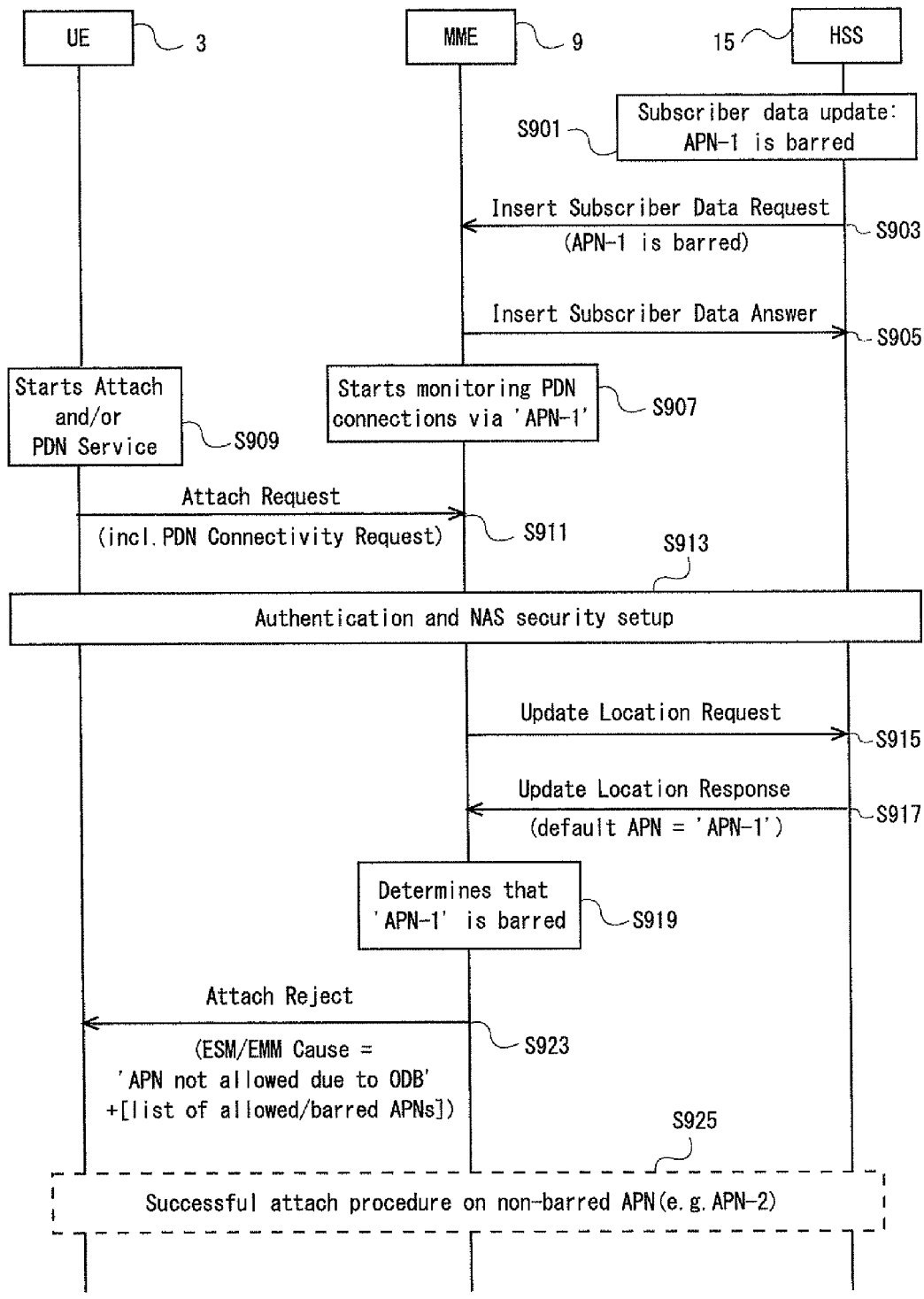
FIG. 10 is a signalling diagram indicating a variation on the procedure shown in FIG. 6.

FIG. 10 is a signalling diagram indicating a variation on the procedure shown in FIG. 6. Steps S901 to S913 of FIG. 10 generally correspond to steps S501 to S513 of FIG. 6, respectively, and thus will not be described in detail.

However, in this example, the mobile telephone 3 does not include an 'ESM information transfer' flag (in the 'PDN Connectivity Request') within the 'Attach Request' message it sends at step S911. Therefore, instead of obtaining the requested APN from the mobile telephone 3 itself (i.e. as shown in steps S515 and S517 of FIG. 6), the MME 9 (using its UE location module 99) generates and sends an 'Update Location Request' message to the HSS 15, as shown at step S915. In response to this message, the HSS 15 returns, at step S917, the name of the default APN for this mobile telephone 3, in an 'Update Location Response' message. In this example, the default APN for this mobile telephone 3 is the same as the previously barred 'APN-1'.

Therefore, after receiving this message, the MME 9 (i.e. its APN authorization module 95) determines, at step S919, that the default access point ('APN-1') is barred for this subscriber. Thus, when the MME 9 rejects the mobile telephone's 3 attempt to use the barred 'APN-1', at S923, it includes in the sent 'Attach Reject' message (or in the 'PDN Connectivity Reject' message which is included in the 'Attach Reject' message) the appropriate rejection cause, i.e. 'APN not allowed due to ODB', and optionally, the list of currently subscribed/barred APNs.

Later, at step S925, the mobile telephone 3 may of course attempt to attach to the network using another, non-barred gateway, for example 'APN-2'.

(Modifications and Alternatives)

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, various examples are discussed illustrating how the core network can inform the mobile telephone about the cause of rejecting a packet data connection attempt or terminating an on-going packet data connection. As already mentioned, a so called 'APN not allowed due to ODB' rejection cause may be used, either at ESM level or at EMM level. It will be appreciated however that other rejection causes may be used instead, for example, 'APN not allowed', or the existing 'Operator Determined Barring' rejection cause. In this case, based on the received rejection cause and the 'list of allowed APNs' or the 'list of barred APNs', the mobile telephone is able to work out whether or not it should try to re-connect to the failed APN or whether it should use another APN instead (or none of them in case all APNs are barred for this subscriber).

In case of LTE, the rejection cause may be sent to the mobile telephone using ESM level signalling, e.g. at least one of a 'PDN CONNECTIVITY REJECT' message, a 'DEACTIVATE EPS BEARER CONTEXT REQUEST' message, and the like. Alternatively, the rejection cause may be sent to the mobile telephone using EMM level signalling, e.g. at least one of an 'ATTACH REJECT' message, a 'TRACKING AREA UPDATE (TAU) REJECT' message, a 'SERVICE REJECT' message, and a 'DETACH REQUEST' message.

However, it will be appreciated that the above embodiments are also applicable to mobile telephones communicating using 2G/3G protocols. In this case, the rejection cause may be sent to the mobile telephone either at a Session Management (SM) level or at a GPRS Mobility Management (GMM) level, using at least one of an 'ATTACH REJECT' message, a 'ROUTING AREA UPDATE (RAU) REJECT' message, a 'SERVICE REJECT' message, and a 'DETACH REQUEST' message.

In the above embodiments, a list of allowed APNs or a list of barred APNs may be provided to the mobile telephone by the MME (based on subscriber specific data received from the HSS). However, it will be appreciated that both lists may be provided in the same EMM/ESM message or in separate signalling messages. Furthermore, it will be appreciated that the list of allowed and/or barred APNs sent by the MME may include only a subset of all allowed/barred APNs for the particular subscriber, e.g. due to size limitation of the signalling message(s) used.

In the above embodiments, the list of allowed/barred APNs is provided to the mobile telephone in case of rejection/termination of a packet data connection involving a barred APN (as illustrated in steps S523, S623, S723, S823, and S923 of FIGS. 5, 6, 7, 8, and 9, respectively). However, it will be appreciated that either one of these lists may be provided to the mobile telephone even if the mobile telephone's PDN connectivity request (or attach request) is accepted by the network. In this case, the MME may include the list(s) in a 'PDN Connectivity Accept' message or an 'Attach Accept' message, as appropriate. This will have the advantage of preventing the mobile telephone from sending in the future any requests for using barred APNs.

Additionally, the mobile telephone may store the received allowed/barred APN list in its memory for later use, and/or update the subscriber's APN control list stored on the USIM accordingly.

The mobile telephone might be configured to warn the user in case of a connection rejection/termination by the MME, e.g. by displaying a notification on the screen of the mobile telephone and/or by an audible warning when an APN is barred.

As a modification of the above examples, the MME may take into account the capabilities of the mobile telephone (e.g. as indicated by the 'UE capability' information provided during registration of the mobile telephone with the network) before applying the above described methods. Therefore, the MME may be configured to send the suggested rejection cause and/or list of allowed/barred APNs only to those mobile telephones that support this functionality. This will have the advantage of preventing the MME from sending information to legacy UEs that will not understand such information.

Although the above examples are described with LTE access in mind, they are applicable to other access technologies as well, such as GPRS and W-CDMA. In case of GPRS or W-CDMA access, it will be appreciated that a Serving GPRS Support Node (SGSN) is used instead of an MME, and a Gateway GPRS Support Node (GGSN) is used instead of a P-GW.

In the above embodiments are implemented using mobile telephones which are cellular telephones. It will be appreciated however that the above embodiments could be implemented using devices other than mobile telephones such as, for example, personal digital assistants, laptop computers, web browsers, etc.

In the above embodiments, a number of software modules were described. As those skilled in the art will appreciate, the software modules may be provided in compiled or un-compiled form and may be supplied to the HSS, to the mobility management entity, to the base station or to the mobile telephone as a signal over a computer network, or on a recording medium. Further, the functionality performed by part or all of this software may be performed using one or more dedicated hardware circuits. However, the use of software modules is preferred as it facilitates the updating of the HSS 15, the mobility management entity 9, the base station 5 and the mobile telephone 3 in order to update their functionalities.

Various other modifications will be apparent to those skilled in the art and thus will not be described in further detail here.

This software can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

This application is based upon and claims the benefit of priority from United Kingdom patent application No. 1301042.6 filed on 21 Jan. 2013, the disclosure of which is incorporated herein in its entirety by reference.

REFERENCE SIGNS LIST 1 telecommunications system
3 mobile telephone (UE)
5 E-UTRAN base station (eNB)
6 radio cell
7 core network
7-V visited network
7-H home network
9 mobility management entity (MME)

13 external IP network
15 home subscriber server (HSS)
16 serving gateway (S-GW)
17-1 packet data network gateway (P-GW)
17-2 packet data network gateway (P-GW)
31 transceiver circuit
33 antenna
35 user interface
37 controller
39 memory
41 operating system
43 communications control module
45 APN configuration module
47 packet data services module
49 non-access stratum (NAS) module
81 transceiver circuit
83 base station interface
85 HSS interface
87 controller
89 memory
91 operating system
93 communications control module
95 APN authorization module
97 NAS module
99 UE location module
151 transceiver circuit
153 MME interface
155 OAM interface
157 controller
159 memory
161 operating system
163 communications control module
165 barring module
167 subscribed APNs
169 operation and maintenance (OAM) module

The invention claimed is:

1. A network node for use in a communications system having a core network and at least one communications device, the network node comprising:
a controller comprising memory and one or more processors configured to:
generate control information for controlling access of the at least one communications device to packet data services that use the core network, wherein the control information identifies at least one gateway and indicates that the at least one communications device is barred from using the at least one identified gateway;
communicate with the at least one communications device including a controller, comprising memory and one or more processors, configured to:
communicate with the generated control information,
monitor communications by the at least one communications device relating to packet data services, and
communicate the control information to the at least one communications device upon the controller indicating a communication attempt by the at least one communication device relating to packet data services that use the at least one identified gateway; and
obtain subscription data from a home subscriber server, the subscription data indicating whether an operator determined barring has been invoked for the at least one communications device, wherein the subscription data comprises a list of barred gateways for the at least one communications device.

2. The network node according to claim 1, wherein the communication attempt comprises a request for a new packet data service that uses the at least one identified gateway and wherein the control information comprises a rejection of the communication attempt.

3. The network node according to claim 1, wherein the communication attempt comprises communication relating to an existing packet data service that uses the at least one identified gateway and wherein the control information comprises a termination of the existing packet data service that uses the at least one identified gateway.

4. The network node according to claim 3, wherein the controller comprising memory and one or more processors is further configured to instruct a network node controlling the at least one identified gateway to terminate the existing packet data service.

5. A communications system comprising:
a core network;
at least one communications device, and
a network node comprising:
a controller comprising memory and one or more processors configured to:
generate control information for controlling access of the at least one communications device to packet data services that use the core network, wherein the control information identifies at least one gateway and indicates that the at least one communications device is barred from using the at least one identified gateway;
communicate with the at least one communications device including a controller, comprising memory and one or more processors, configured to:
communicate with the generated control information,
monitor communications by the at least one communications device relating to packet data services, and
communicate the control information to the at least one communications device upon the controller indicating a communication attempt by the at least one communication device relating to packet data services that use the at least one identified gateway; and
obtain subscription data from a home subscriber server, the subscription data indicating whether an operator determined barring has been invoked for the at least one communications device, wherein the subscription data comprises a list of barred gateways for the at least one communications device.

6. A method performed by a network node in a communications system having a core network and at least one communications device, the method comprising:
generating control information for controlling access of the at least one communications device to packet data services that use the core network, wherein the control information identifies at least one gateway and indicates that the at least one communications device is barred from using the at least one identified gateway;
communicating with the at least one communications device including a controller, comprising memory and one or more processors, configured to communicate with the generated control information;
monitor communications by the at least one communications device relating to packet data services;

communicate the control information to the at least one communications device upon the controller indicating a communication attempt by the at least one communication device relating to packet data services that use the at least one identified gateway; and obtaining subscription data from a home subscriber server, the subscription data indicating whether an operator determined barring has been invoked for the at least one communications device, wherein the subscription data comprises a list of barred gateways for the at last one communications device.

7. A non-transitory computer-readable storage medium storing instructions for enabling a computer to implement method performed by a network node in a communications system having a core network and at least one communications device, the method comprising:

generating control information for controlling access of the at least one communications device to packet data services that use the core network, wherein the control information identifies at least one gateway and indicates that the at least one communications device is barred from using the at least one identified gateway;

communicating with the at least one communications device including a controller, comprising memory and one or more processors, configured to communicate with the generated control information;

monitor communications by the at least one communications device relating to packet data services;

communicate the control information to the at least one communications device upon the controller indicating a communication attempt by the at least one communication device relating to packet data services that use the at least one identified gateway; and obtaining subscription data from a home subscriber server, the subscription data indicating whether an operator determined barring has been invoked for the at least one communications device, wherein the subscription data comprises a list of barred gateways for the at least one communications device.

* * * * *